US012809902B2

(12) United States Patent
Zhang et al.

(10) Patent No.: US 12,809,902 B2
(45) Date of Patent: Nov. 24, 2026

(54) OUT-OF-DISTRIBUTION QUERY DETECTION FOR IMPROVING LANGUAGE MODEL GENERATION

(71) Applicant: Intuit Inc., Mountain View, CA (US)

(72) Inventors: Jiaxin Zhang, Mountain View, CA (US); Wendi Cui, Jersey City, NJ (US); Kamalika Das, Saratoga, CA (US); Sricharan Kallur Palli Kumar, Ann Arbor, MI (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/818,569

(22) Filed: Aug. 28, 2024

(65) Prior Publication Data

US 2026/0064745 A1 Mar. 5, 2026

(51) Int. Cl.

| | |
|---|---|
| ***G06F 16/00*** | (2019.01) |
| ***G06F 16/332*** | (2019.01) |
| ***G06F 16/334*** | (2025.01) |
| ***G06F 16/383*** | (2019.01) |

(52) U.S. Cl.

CPC ...... *G06F 16/3347* (2019.01); *G06F 16/3326* (2019.01); *G06F 16/3346* (2019.01); *G06F 16/383* (2019.01)

(58) Field of Classification Search

CPC ............. G06F 16/3347; G06F 16/3326; G06F 16/3346; G06F 16/383

See application file for complete search history.

(56) References Cited

U.S. PATENT DOCUMENTS

| | | | | |
|---|---|---|---|---|
| 2014/0310218 A1* | 10/2014 | Min | .......................... | G06N 3/08 706/16 |
| 2015/0120773 A1* | 4/2015 | Finkelstein | ....... | G06F 16/90324 707/767 |
| 2015/0278355 A1* | 10/2015 | Hassanpour | .......... | G06F 16/951 707/706 |

(Continued)

OTHER PUBLICATIONS

Tunkelang, Daniel, "AI-Powered Search: Embedding-Based Retrieval and Retrieval-Augmented Generation (RAG)," Medium, Apr. 8, 2024, https://web.archive.org/web/20240523152530/https://dtunkelang.medium.com/ai-powered-search-embedding-based-retrieval-and-retrieval-augmented-generation-rag-cabeaba26a8b (Year: 2024).*

(Continued)

*Primary Examiner* — Syed H Hasan

(74) *Attorney, Agent, or Firm* — Lathrop GPM LLP

(57) ABSTRACT

A method includes receiving a query from a user device and applying an embedding model to the query to generate a query vector data structure. A vector comparator is applied to the query vector data structure and embedded document chunk vector data structures to output a score measuring a semantic similarity between the vector data structures. The embedded document chunk vector data structures are generated by the embedding model being applied to documents in a knowledge base corpus. Responsive to the score failing to satisfy a threshold value, the query is rejected as being an out-of-distribution query by transmitting an electronic reject message. Responsive to the score satisfying the threshold value and indicating that the query is an in-distribution query, the language model is applied to the query and to the knowledge base corpus to output an answer. The method also includes returning the answer to the user device.

14 Claims, 7 Drawing Sheets

(56) References Cited

U.S. PATENT DOCUMENTS

| | | | | |
|---|---|---|---|---|
| 2018/0349794 | A1* | 12/2018 | Georges | G06N 5/04 |
| 2024/0346256 | A1* | 10/2024 | Qin | G06F 40/216 |
| 2024/0404687 | A1* | 12/2024 | Bell | G06Q 10/0633 |
| 2025/0086235 | A1* | 3/2025 | Kumar | G06F 16/90332 |
| 2025/0131247 | A1* | 4/2025 | Mondlock | G06N 3/0475 |
| 2025/0258814 | A1* | 8/2025 | Tiwari | G06F 16/24522 |

OTHER PUBLICATIONS

Asai, A., et al., Self-Rag: Learning to Retrieve, Generate, and Critique through Self-Reflection, Oct. 17, 2023, 30 pages.
Jiang, Z., et al., "Active Retrieval Augmented Generation", Oct. 22, 2023, 24 pages.
Kadavath, S., et al., "Language Models (Mostly) Know What They Know", Nov. 21, 2022. 43 pages.
Kang, M., et al., "C-Rag: Certified Generation Risks for Retrieval-Augmented Language Models", Jul. 30, 2024, 38 pages.
Karpukhin, V., et al. "Dense Passage Retrieval for Open-Domain Question Answering", In Proceedings of the 2020 Conference on Empirical Methods in Natural Language Processing (EMNLP), Associated for Computational Linguistics, Sep. 30, 2020, 13 pages.
Lee, K., et al., "A Simple Unified Framework for Detecting Out-of-Distribution Samples and Adversarial Attacks", Advances in Neural Information Processing Systems, Oct. 27, 2018, 20 pages.
Lewis, P., et al., "Retrieval-Augmented Generation for Knowledge-Intensive NLP Tasks", Advances in Neural Information Processing Systems, Apr. 12, 2021, 19 pages.
Liu, W., et al., "Energy-Based Out-of-Distribution Detection", Advances in Neural Information Processing Systems, Apr. 26, 2021, 16 pages.
Ni, S., et al., "When Do LLMS Need Retrieval Augmentation? Mitigating LLMS' Overconfidence Helps Retrieval Augmentation", Jun. 11, 2024, 14 pages.
Ren, J., et al., "Out-of-Distribution Detection and Selective Generation for Conditional Language Models", In the Eleventh International Conference on Learning Representations, Mar. 7, 2023, 32 pages.
Ren, R., et al., "Investigating the Factual Knowledge Boundary of Large Language Models with Retrieval Augmentation", Jul. 23, 2023, 11 pages.
Shuster, K., et al., "Retrieval Augmentation Reduces Hallucination in Conversation", In Findings of the Association for Computational Linguistics, Apr. 15, 2021, 21 pages.
Tan, C., et al., "Tegtok: Augmenting Text Generation via Task-Specific and Open-World Knowledge", In Findings of the Association for Computational Linguistics, Mar. 16, 2022, 13 pages.
Wang, Y., et al., "Self-Knowledge Guided Retrieval Augmentation for Large Language Models", arXiv, Oct. 8, 2023, 12 pages.
Yan, Q., et al., "Corrective Retrieval Augmented Generation", Feb. 16, 2024, 14 pages.
Yang, J., et al., "Generalized Out-of-Distribution Detection: A Survey", Jan. 23, 2024, 32 pages.
Yang, Y., et al., "Alignment for Honesty", Dec. 12, 2023, 24 pages.
Yin, Z., et al., "Do Large Language Models Know What They Don't Know?", May 30, 2023, 10 pages.
Yu, W., et al., "Generate Rather than Retrieve: Large Language Models are Strong Context Generators", In the Eleventh International Conference on Learning Representations, Jan. 25, 2023, 27 pages.
Zhou, W., et al., "Contrastive Out-of-Distrubution Detection for Pretrained Transformers", In Proceedings of the 2021 Conference on Empirical Methods in Natural Language Processing, Sep. 8, 2021, 12 pages.

* cited by examiner

OUT-OF-DISTRIBUTION QUERY DETECTION FOR IMPROVING LANGUAGE MODEL GENERATION

BACKGROUND

Language models may be used to search for information on a computer system. However, the computer system has a limited field of knowledge defined by the knowledge base corpus which the language model can search.

In some cases, a user may query the knowledge base corpus using the language model, but the query may request information that is outside the knowledge base corpus. As a result, the language model may return an incorrect answer to the query. When a low fault tolerance is set for information search systems, such as for medicine and finance information search systems, using the language model to perform such out-of-knowledge queries may result in an unacceptable error rate.

Additionally, the knowledge base corpus may be out-of-date. As a result, queries executed by the language model may not be answered properly. However, maintaining the knowledge base corpus can be expensive and time consuming. Furthermore, user interest may alter over time, and thus information of interest to the user may be no longer present in the knowledge base corpus. Thus, the information retrieval accuracy of the language model may degrade over time.

A technical problem is presented in view of the above. The technical problem how to improve the performance of a language model when using the language model to retrieve information from a knowledge base corpus. In other words, the technical problem is how to improve the accuracy of a language model when the language model is applied to a query on the knowledge base corpus.

SUMMARY

One or more embodiments provide for a method. The method includes receiving, at an embedding model executed by a processor, a user query from a user device. The method also includes applying the embedding model to the user query to generate a query vector data structure. The method also includes applying a vector comparator to the query vector data structure and embedded document chunk vector data structures to output a similarity score. The similarity score is a measure of a semantic similarity between the query vector data structure and the embedded document chunk vector data structures. The embedded document chunk vector data structures are generated by the embedding model applied to a knowledge base corpus including documents. Each of the embedded document chunk vector data structures corresponds to an associated document of the documents. The method also includes rejecting, responsive to the similarity score failing to satisfy a threshold value, the user query as being an out-of-distribution query by transmitting an electronic reject message to the user device. The method also includes applying, responsive to the similarity score satisfying the threshold value and indicating that the user query is an in-distribution query, the language model to the user query and to the knowledge base corpus to output an answer to the user query. The answer is based on a responsive document in the documents. The method also includes returning, responsive to generating the answer, the answer to the user device.

One or more embodiments provide for a system. The system includes a server including a processor and a data repository in communication with the processor, and storing a user query and a query vector data structure. The query vector data structure represents the user query in a vector space. The data repository also stores a knowledge base corpus. The knowledge base corpus including documents. The data repository also stores embedded document chunk vector data structures. Each of the embedded document chunk vector data structures represents an associated document of the documents. The data repository also stores a threshold value, an electronic reject message and an answer. The processor is programmed to apply an embedded model to a document to output a vector data structure. The processor is also programmed to apply a vector comparator to vectors to output a similarity score. The similarity score is a measure of a semantic similarity between the vectors. The processor is also programmed to apply a language model to the vector data structure to output a natural language text string. The system also includes a server controller executable by the processor to perform a computer implemented method including receiving the user query from a user device. The computer-implemented method also includes applying the embedding model to the user query to generate the query vector data structure. The computer-implemented method also includes applying the vector comparator to the query vector data structure and the embedded document chunk vector data structures to output the similarity score. The computer-implemented method also includes rejecting, responsive to the similarity score failing to satisfy the threshold value, the user query as being an out-of-distribution query by transmitting the electronic reject message to the user device. The computer-implemented method also includes applying, responsive to the similarity score satisfying the threshold value and indicating that the user query is an in-distribution query, the language model to the user query and to the knowledge base corpus to output the answer to the user query. The computer-implemented method also includes returning, responsive to generating the answer, the answer to the user device.

One or more embodiments provide for another method. The method includes applying the language model executed by a processor to documents to generate synthetic in-knowledge queries. The documents are associated with a knowledge base corpus. The method also includes applying an embedding model executed by the processor to the synthetic in-knowledge queries to generate query distribution data structures. Each of the query distribution data structures corresponds to an associated document of the documents. The method also includes applying a vector comparator executed by the processor to the query distribution data structures to output a similarity score. The similarity score is a measure of a semantic similarity between the query distribution data structures. The method also includes determining, responsive to the similarity score, whether a shift in query distribution has occurred. The method also includes generating, responsive to the shift in the query distribution, an out-of-distribution detection alert. The method also includes updating, responsive to the out-of-distribution detection alert, the knowledge base corpus to remove an out-of-distribution document or to add an in-distribution document. Updating generates an updated knowledge base corpus. The method also includes receiving a new query to the language model. The method also includes applying the language model and the new query to the updated knowledge base corpus to generate an answer to the new query.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
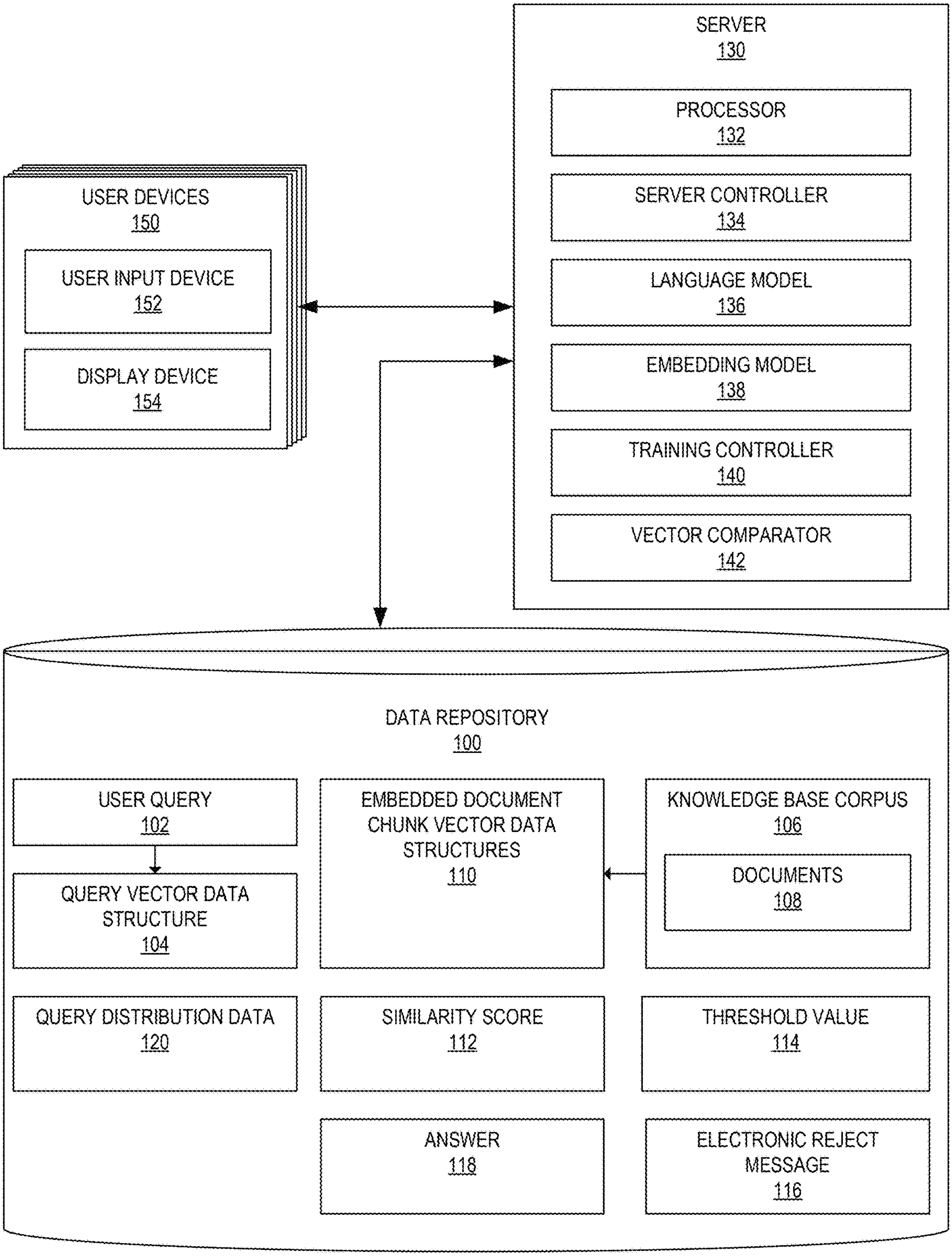
FIG. 1A and FIG. 1B show a computing system, in accordance with one or more embodiments.

One or more embodiments are directed to a technical solution to the above-identified technical problem. Briefly, again, the technical problem is how to improve the accuracy of a language model when the language model is applied to a query to retrieve information from a knowledge base corpus. The technical solution is described with respect to the following figures.

Briefly, the technical solution involves using out-of-distribution query detection to determine if the language model can accurately answer the user query. If the query is determined to be out-of-distribution of the knowledge base corpus, then the query is rejected. Thus, the language model is prevented from returning incorrect answers, or the probability of the language model returning an incorrect answer is mitigated. Preventing the language model from returning incorrect answers to a user query improves the performance of the language model.

In an embodiment, the out-of-distribution query may be reformed or transformed into an in-distribution query that is in-distribution of the knowledge base corpus. In another embodiment, the knowledge base corpus may be revised so that the out-of-distribution query becomes an in-distribution query, relative to the knowledge base corpus. Thus, again, the language model may be improved by causing the language model to return more accurate answers to user queries.

Specifically, one or more embodiments provide procedures to inspect the relevance of a user query to detect out-of-knowledge queries with low knowledge relevance. Out-of-knowledge queries may be rejected, improving the model as described above, and also saving computing resources to handle other queries. Also, the language model can avoid providing inaccurate responses that might be generated when the query is outside of the scope of knowledge corpus or if the information in the corpus is out-of-date.

Additionally, a collection of user queries may be examined to detect shifts in the query distribution which may indicate that the knowledge corpus is no longer sufficiently capable of supporting the interests of the users. The knowledge base corpus may be updated in response to shifts in the query distribution, thereby improving the performance of the language model. Additionally, resources may be saved by reducing or eliminating unnecessary updates to the knowledge base corpus.

When a user query is received, a query vector is generated by the server. The query vector is compared with vector data of the knowledge corpus to determine whether the query vector is sufficiently similar to the knowledge corpus. When the query vector is sufficiently similar, and thus the knowledge corpus is relevant to the query, the language model processes the query and returns a response. When the query vector is not sufficiently similar, the query may be rejected.

In an embodiment, the query may be reformed such that the query becomes sufficiently similar to the knowledge base corpus. In an embodiment, the knowledge base corpus may be updated so that the query becomes sufficiently similar to the knowledge base. In an embodiment, the query may be reformed and the knowledge base corpus revised. In any of the above cases, the language model may apply the revised query to the knowledge base corpus, or the language model may apply the query to the revised knowledge base corpus.

Regardless of how the query is handled (processed or rejected), the query may be added to a collection of historic queries. The historic queries then may be evaluated to determine whether the information being requested in the historic queries has shifted and thus whether the knowledge corpus is no longer sufficiently relevant to the incoming queries. Based on the evaluation, the knowledge corpus may be updated, for example, by automatically downloading recent versions of documents in the knowledge corpus.

Figure 1B:
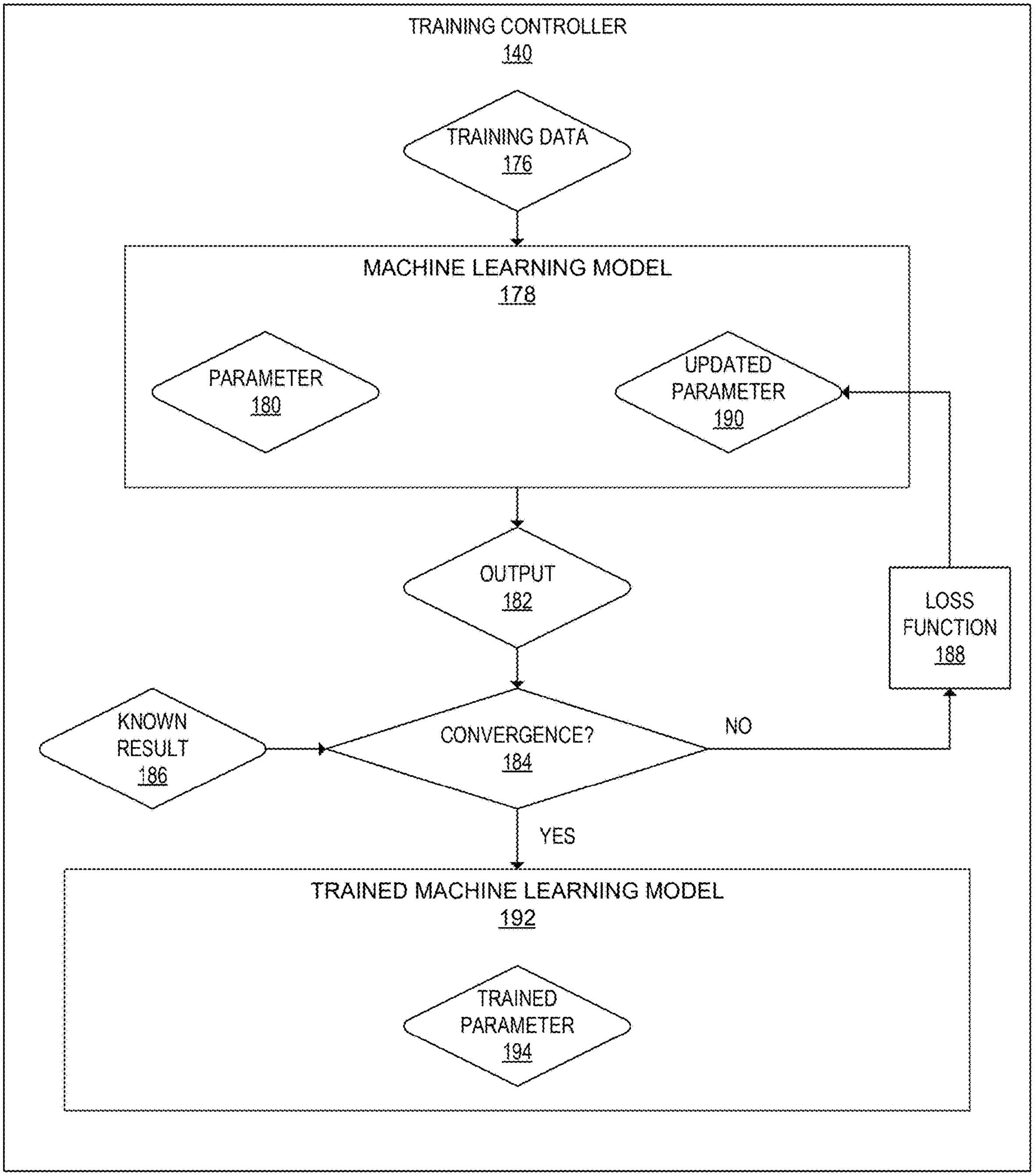

Attention is now turned to the figures. FIG. 1A and FIG. 1B show a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a user query (102). The user query (102) is alphanumeric text or special characters received from a user device, such as the user devices (150) defined below, or some other computing process. The user query (102) may have been submitted to find information specified in the user query (102).

The user query (102) may be out-of-distribution or in-distribution, relative to the knowledge base corpus (106). The user query (102) is out-of-distribution, relative to the knowledge base corpus (106), when the similarity score (112) (defined below) for the user query (102) fails to satisfy the threshold value (114) (defined below). If a language model (136) (defined below) is applied to an out-of-distribution query to retrieve an answer (118) from the knowledge base corpus (106), then the probability that the answer (118) is incorrect is defined as unacceptable. Stated differently, the term "out-of-distribution" means that the user query (102) is outside a pre-determined distribution of semantic meanings of the knowledge base corpus (106).

The user query (102) is in-distribution, relative to the knowledge base corpus (106), when the similarity score (112) (defined below) for the user query (102) satisfies the threshold value (114) (defined below). If a language model (136) (defined below) is applied to an in-distribution query to retrieve an answer (118) from the knowledge base corpus (106), then the probability that the answer (118) is correct is defined as acceptable. Stated differently, the term "in-distribution" means that the user query (102) is within a pre-determined distribution of semantic meanings of the knowledge base corpus (106).

The data repository (100) also stores a query vector data structure (104). The query vector data structure (104) represents the user query (102) in a low-dimensional space. The query vector data structure (104) may be a mapping of the user query (102) to the low-dimensional space. The low-dimensional space is a form of data that a processor may process. The query vector data structure (104) may be generated by an embedding model, as described with respect to FIG. 2.

The data repository (100) also stores a knowledge base corpus (106). The knowledge base corpus (106) is a collection of documents (108). The documents (108) are computer files or other data structures that contain information that may be of use answering the user query (102). Each of the documents (108) contribute to the total scope of knowledge of the knowledge base corpus (106).

The data repository (100) also stores one or more embedded document chunk vector data structures (110). Each of the embedded document chunk vector data structures (110) correspond to one of the documents (108) and represents the document in the low-dimensional space, or a part of the document in the low-dimensional space. The embedded document chunk vector data structures (110) may be mappings of the documents (108), or parts of the documents (108), to the low-dimensional space. An embedding model may generate the embedded document chunk vector data structures (110).

The data repository (100) also stores a similarity score (112). The similarity score (112) represents the semantic similarity between the query vector data structure (104) and the embedded document chunk vector data structures (110), as determined by a vector comparator (142), defined below. The similarity score (112) may be based on the closest of the documents (108) to the user query (102), in the low-dimensional space. The term "closest" is defined as a particular pair of the query vector data structure (104) and one of the embedded document chunk vector data structures (110) having a semantic similarity score that is less than other similarity scores of other pairs of embedded document chunk vector data structures (110) relative to the query vector data structure (104).

The data repository (100) also stores a threshold value (114). The threshold value (114) is boundary or limit value to which the similarity score (112) may be compared. Use of the threshold value (114) is described with respect to FIG. 2.

The data repository (100) also stores an answer (118). The answer (118) is a string of alphanumeric text or special character(s) that is generated by a language model (136) when applied to the user query (102). The answer (118) may provide the information requested in the user query (102) in a natural language text, such as generated by the language model (136), as described below.

The data repository (100) also stores an electronic reject message (116). The electronic reject message (116) is a string of alphanumeric text or special character(s) generated in response to the user query (102) when the similarity score (112) does not satisfy the threshold value (114). The electronic reject message (116) indicates that the user query (102) has been rejected and/or not being answered. The electronic reject message (116) may indicate that the user query (102) is outside the scope of knowledge of the knowledge base corpus (106).

The data repository (100) also stores query distribution data (120). The query distribution data (120) is a data structure containing data that indicates knowledge fields being relevant to a set of queries. Specifically, the query distribution data (120) represents the relative numbers of out-of-distribution queries relative to in-distribution queries. The query distribution data (120) may be based on multiple queries received over time which may include the user query (102).

The system shown in FIG. 1A may include other components. For example, the system shown in FIG. 1A also may include a server (130). The server (130) is one or more computer processors, data repositories, communication devices, and supporting hardware and software. The server (130) may be in a distributed computing environment. The server (130) is configured to execute one or more applications, such as the language model (136), the embedding model (138), the training controller (140), and the vector comparator (142). An example of a computer system and network that may form the server (130) is described with respect to FIG. 6A and FIG. 6B.

The server (130) includes a computer processor (132). The computer processor (132) is one or more hardware or virtual processors which may execute computer readable program code that defines one or more applications, such as the language model (136), the embedding model (138), or the training controller (140). An example of the computer processor (132) is described with respect to the computer processor(s) (502) of FIG. 6A.

The server (130) also may include a server controller (134). The server controller (134) is software or hardware programmed to coordinate execution of one or more of the language model (136), the embedding model (138), the training controller (140), or the vector comparator (142). The server controller (134) also may be software or hardware programmed to cause the processor (132) to execute one or more steps of the method of FIG. 2.

The server (130) also includes a language model (136). The language model (136) is a natural language processing machine learning model. An example of the language model (136) may be a large language model, such as CHATGPT®. However, the language model (136) may be other types of language models. Use of the language model (136) is described with respect to FIG. 2.

The server (130) also includes an embedding model (138). The embedding model (138) is software or hardware that encodes the meaning of natural language text into a vector containing low-dimensional data directly readable by the processor (132). The embedding model (138) may be a natural language processing machine learning model, in some embodiments. However, the embedding model (138) may be other types of embedding models, such as Word2Vec, or others. Use of the embedding model (138) is described with respect to FIG. 2.

The server (130) also may include a training controller (140). The training controller (140) is software or application specific hardware which, when executed by the computer processor (132), trains one or more machine learning models (e.g., the language model (136) and the embedding model (138)). The training controller (140) is described in more detail with respect to FIG. 1B.

The server (130) also may include a vector comparator (142). The vector comparison engine is software or application specific hardware which, when executed by the computer processor (132), compares multiple vectors to generate the similarity score (112) (which, again, indicates the similarity of the vectors in a vector space). The vector comparator may be a cosine similarity model, an embedding model such as Word2Vec, the language model (136), or other types of machine learning models trained to generate a similarity score that represents a semantic similarity between two vectors.

FIG. 1A also shows one or more user devices (150). The user devices (150) are the computing systems which users use to submit the user query (102). The user devices (150) may include a mouse, keyboard, microphone, touch screen, haptic device, etc., with which the user may interact. Thus, the user devices (150) are computing systems, which a user may use to interact with the server (130). For example, the user query (102) may be received from one or more of the user devices (150), as described in step 200 of FIG. 2.

In many cases, the user devices (150) are not part of a system owned or operated by the entity that owns or operates the server (130). Such user devices (150) may be referred to as "remote" devices, and thus may not be part of the system of FIG. 1A. However, one or more of the user devices (150) may be part of the same system of which the server (130) is a part. In this case, such user devices (150) may be referred to as "local" devices, even if the user devices (150) are not in the same physical geographical location. Local devices may be considered part of the system shown in FIG. 1A.

Figure 6A:
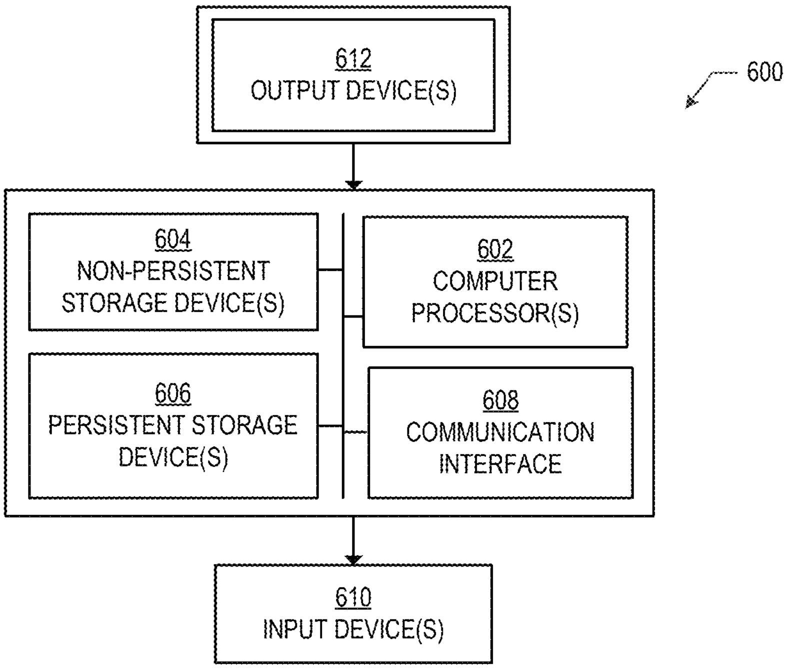
FIG. 6A and FIG. 6B show an example of a computing system and network environment in accordance with one or more embodiments.

The user devices (150) may include a user input device (152) and a display device (154), as described in more detail with respect to FIG. 6A.

While FIG. 1A shows a configuration of components, other configurations may be used without departing from the scope of one or more embodiments. For example, various components may be combined to create a single component. As another example, the functionality performed by a single component may be performed by two or more components.

Attention is turned to FIG. 1B, which shows the details of the training controller (140). The training controller (140) is a training algorithm, implemented as software or application specific hardware, that may be used to train one or more of the machine learning models described, with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some pre-determined amount, or until some other termination condition occurs. After training, the final adjusted model is applied to unknown data (i.e., a query for which the actual resulting vector is not known) in order to make a vector.

Some machine learning models may be applied to vector data structures. A vector is a computer readable data structure. A vector may take the form of a matrix, an array, a graph, or some other data structure. However, a frequently used vector form is a one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, the query vector data structure (104), and the embedded document chunk vector data structures (110) may be expressed as vectors. Similarly, the user query (102), and documents (108) may be converted from natural language into vectors as part of executing the embedding model (138).

Returning to the operation of the training controller (140), training starts with training data (176), which may be expressed in vector form. The training data (176) may include queries, and the documents (108) from FIG. 1A, expressed in vector form.

The training data (176) may be labeled. The labels represent a known result. Thus, a label applied to a query may indicate the expected vector to be generated.

Thus, the training data (176) may be data for which the final result is known with certainty. For example, when the embedding model (138) is called during training to process a query, the embedding model (138) generates the vector in a low-dimensional, embedded-vector space. However, the label on the query is the expected vector—the resulting vector that is known to be correct. If the prediction does not match the label, then the weights of the layers may be updated and the training process iterated.

More generally, the training data (176) is provided as input to the machine learning model (178), which may be the embedding model (138) of FIG. 1A. The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) provided goes through a convergence process (184). The convergence process (184) is programmed to achieve convergence during the training process. Convergence is a state of the training process, described below, in which a pre-determined end condition of training has been reached. The pre-determined end condition may vary based on the type of machine learning model (178) being used (supervised versus unsupervised machine learning), or may be pre-determined by a user (e.g., convergence occurs after a set number of training iterations, described below).

In the case of supervised machine learning (e.g., the embedding model (138) of FIG. 1A), the convergence process (184) compares the output (182) to a known result (186). The known result (186) is stored in the form of labels for the training data (176). For example, the known result (186) for a particular entry in an output (182) vector of the machine learning model (178) may be a known value, and that known value is a label that is associated with the training data (176).

Continuing the example of supervised machine learning model training, a determination is made whether the output (182) matches the known result (186) to a pre-determined degree. The pre-determined degree may be an exact match, a match to within a pre-specified percentage, or some other metric for evaluating how closely the output (182) matches the known result (186). Convergence may occur when the known result (186) matches the output (182) to within a pre-specified percentage. When many predictions are involved, then convergence may occur when more than a threshold number of predictions correctly match the corresponding labels.

For example, the threshold may be 95%. In this case, when the embedding model's (138) accuracy reaches 95% (representing, that in 95 times out of 100 query vectors the embedding model (138) correctly generates) then convergence occurs.

In the case of unsupervised machine learning, the convergence process (184) may be compared to the output (182) or to a prior output in order to determine a degree to which the current output changed relative to the immediately prior output or to the original output. Once the degree of change fails to satisfy the threshold degree of change, then the machine learning model may be considered to have achieved convergence. Alternatively, an unsupervised model may determine pseudo labels be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188). The program may be an algorithm which attempts to guess how the parameter (180) may be changed so that the next execution of the machine learning model (178), using the training data (176) with the updated parameter (190), will have an output (182) that is more likely to result in convergence. In this manner, the next execution of the machine learning model (178) is more likely to match the known result (186) (supervised learning), or which is more likely to result in an output (182) that more closely approximates the prior output (one unsupervised learning technique), or which otherwise is more likely to result in convergence.

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on an unknown query (which may be in the form of an unknown data vector) for which the final result is not known. The output of the trained machine learning model (192) is then treated as the generated vector relative to the unknown query.

Figure 2:
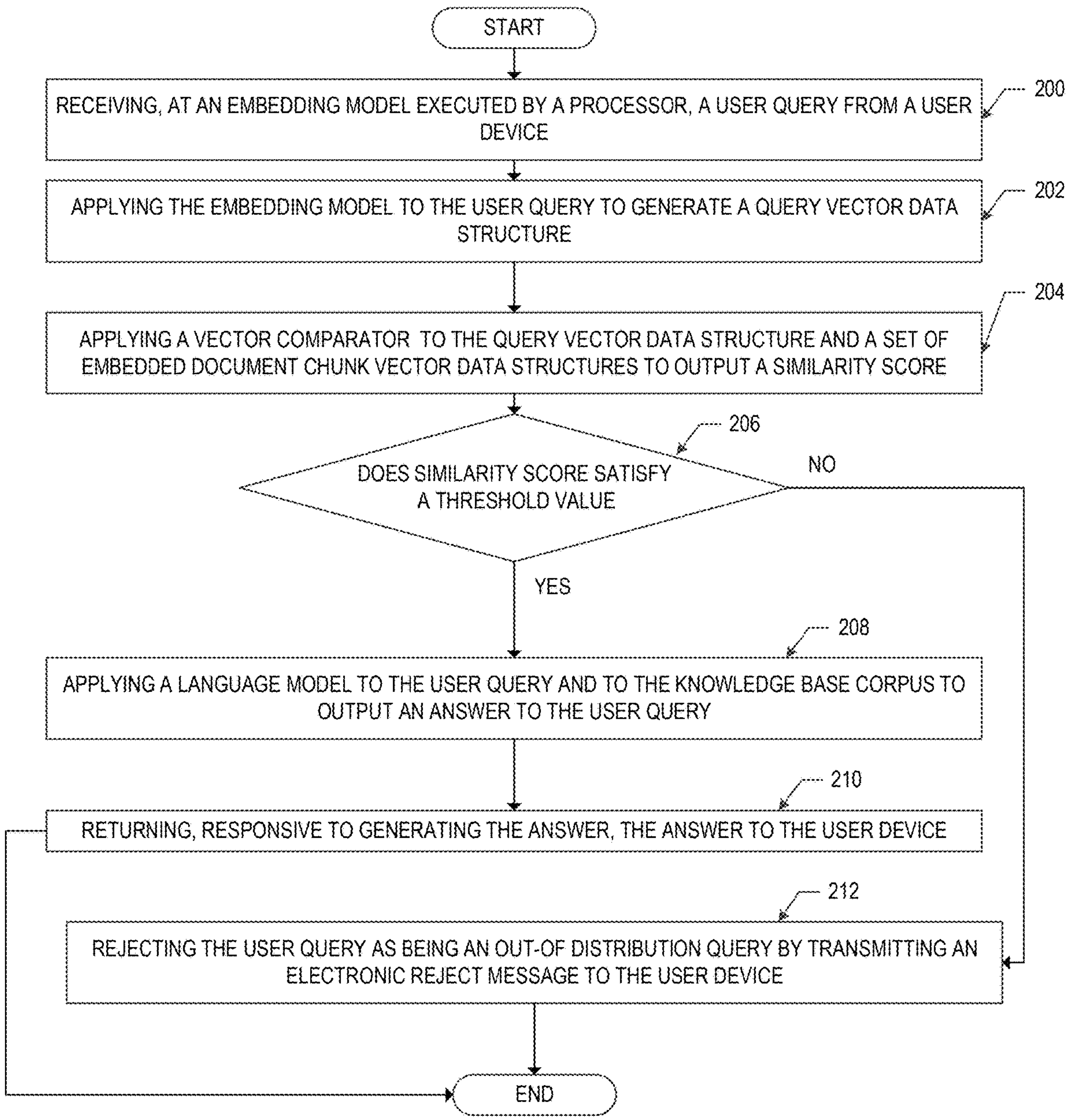
FIG. 2 shows a flowchart of a method for out-of-distribution query detection, in accordance with one or more embodiments.

FIG. 2 shows a flowchart of a method for query similarity detection, in accordance with one or more embodiments. The method of FIG. 2 may be implemented using the system of FIG. 1A and FIG. 1B and one or more of the steps may be performed on or received at one or more computer processors.

Step 200 includes receiving, at an embedding model executed by a processor, a user query from a user device. A user may generate the user query, for example, who is interested in answering a question based on a knowledge base corpus. The user query also could be received from an automatic process calling for information from the knowledge base corpus. The language model may process the user query to determine what the user query is requesting, for example, requesting a document, requesting information, etc.

Step 202 includes applying the embedding model to the user query to generate a query vector data structure. The embedding model encodes the user query as a set of vector representations in a m-dimensional latent space. The embedding model encodes language data in a lower dimensional space. The query vector data structure allows comparison of vectors to determine semantic similarity of the vectors.

Step 204 includes applying a vector comparator to the query vector data structure and a set of embedded document chunk vector data structures to output a similarity score. The set of embedded document chunk vector data structures are vector representations in the m-dimensional latent space of documents. Thus, a numerical analysis may be performed on the vector data structures to identify which of the embedded document chunk vector data structures are closest, in semantic distance, are closest to the query vector data structure.

As described with respect to FIGS. 1A and 1B, the similarity score is a measure of a semantic similarity between the query vector data structure and the set of embedded document chunk vector data structures. The vector comparator can provide a semantic similarity for each embedded document chunk vector data structures to the query vector data structure. Alternatively, the vector comparator can provide a single semantic similarity comparing the set of embedded document chunk vector data structures to the query vector data structure, for example, an average semantic similarity, the semantic similarity of the closest, in the vector space, embedded document chunk vector data structure to the query vector data structure, etc.

The set of embedded document chunk vector data structures are generated by the embedding model applied to a knowledge base corpus including a number of documents. The set of embedded document chunk vector data structures may be generated in advance of receiving the user query and stored for use. As new documents are added to the knowledge base corpus, the new embedded document chunk vector data structures may be generated by the embedding model applied to the new documents and the new embedded document chunk vector data structures added to the existing embedded document chunk vector data structures.

In an embodiment, a goodness of fit test may be performed to determine the score. Given a fixed in-knowledge query distribution, P1, and a new query, q, sampled from unknown distribution P, the problem of deciding if q is out-of-distribution (i.e., out of knowledge) can be formalized as testing the null hypothesis:

$$H_0\colon P = P1 \text{ against } H_1\colon P \neq P. \quad \text{(equation 1)}$$

Let $F(t)=\mathbb{P}\,(t(q)\leq t|H_0$ denote the cumulative distribution function (CDF) of the test statistics under $H_0$. The p-value of the test is $1-F(t)$ and the critical value for a test of size $\acute{\alpha}$ is $c\,(\acute{\alpha};\,P1):=\inf\{t\colon F(t)>1-\acute{\alpha}\}$. The Goodness of Fit test then rejects $H_0$ if $1-F(t)\leq\acute{\alpha}$ or $t\geq c(\acute{\alpha}; P1)$, indicating that the sample is out-of-knowledge (i.e., out of distribution), with type I error bounded by $\acute{\alpha}$.

In practice, the in-knowledge distribution is unknown, such that the p-value and critical value cannot be calculated analytically. However, they can be approximated through a sampling process. Given a set of in-knowledge queries Q1, an estimation may be performed of the empirical cumulative distribution function (eCDF) of test statistics under $H_0$ using Q1:

$$\mathcal{F}(t(q); Q1) = \left(1 + \sum\nolimits_{qi\in Q1}^{1}\{t(q_i) \leq t(q)\}\right)/1 + |Q1|. \quad \text{(equation 2)}$$

The p-value and critical value can thus be obtained as $p(t(q))=1-\mathcal{F}(t(q); Q1)$ and $c(\acute{\alpha}; Q1):=\inf\{t: \mathcal{F}(t; Q1)>1-\acute{\alpha}\}$. According to Donsker's theorem, any desired precision of this estimation can be achieved by increasing the sample size. A larger p-value indicates that the query is more relevant to the empirical distribution and thus more likely to be in-knowledge (i.e., in distribution).

The proposed hypothesis testing framework requires mapping a given test query to a numerical score as the test statistics. Ideally, the score should capture the degree to which the test query deviates from the distribution of queries encapsulated by the corpus, so that a higher score indicates that the test query is more likely to be out of knowledge. As there is no clear guidance from prior literature on which test statistic provides the best performance in this scenario, we explore the following options.

The first option is the Maximum Similarity Score (MSS). A simple baseline is to use the similarity score between the query and the most relevant document chunk from the corpus measured in the embedding space as the test statistic, i.e., $t(q)=-\max_{d\in D} S(E\phi(d), E\phi(q))$.

The second option is the kth nearest neighbor (KNN). An extension of the maximum similarity score is to estimate the similarity score between the query and its kth nearest document embeddings. In other words, $t(q)=-sk$ where $sk$ is the k-th largest element of $\{S(E\phi(d), E\phi(q))|d\in D\}$.

A third option is entropy. The entropy of the retriever probability distribution $P\phi(d|q)$ captures the retrieval uncertainty where a higher value may be suggestive of potential out-of-knowledge queries. For computational efficiency, the entropy may be determined using only the k nearest document entries.

A fourth option is energy. The free energy function of a softmax-based neural classifier contains useful cues for distinguishing out-of-distribution samples. Specifically, an embedding model may be trained with contrastive loss by computing the energy score of a query with respect to its k nearest document entries as $$t(q) = -\tau \log \sum\nolimits_{i=1}^{k} g(qi)$$

where $g(qi)=\exp(S(E\phi(d), E\phi(qi)/\tau)$ and $\tau$ is a temperature parameter set to 1.0 by default.

Meta-analytic Testing. In addition to the aforementioned univariate tests, additional meta-analytic tests were conducted. This is accomplished by running k independent univariate tests for each of the k nearest neighbors and then performing a meta-analysis on the test results. An aggregated test statistic is obtained for the global null hypothesis. Specifically, given a set of p-values $\{p_i(q)\}$ (for i=0 to k) derived from performing k independent tests using the i-th nearest neighbors, the test statistic is derived as $$\sum\nolimits_{i=0}^{k} pi(q)$$

and the (7) Simes method derives the test statistic as $\min_i k\, p_{(i)}/i$ where p(i) is the i-th p-value after sorting.

Synthesizing In-Knowledge Queries. The above testing procedure requires obtaining a set of in-knowledge queries for estimating the eCDF. However, as noted, such a set of queries may not be readily available. Thus, synthetic in-knowledge queries are generated by prompting a language model to generate question-answer pairs based on each document chunk, i.e., by drawing samples from $P\theta(q, a|D)$. The answers generated along with the questions are intended to ensure the generated question can be answered based on the context of the corpus. The obtained synthetic question set $\hat{Q}_I$ serves as a proxy of the in-knowledge queries for deciding the critical region at development time and the derived threshold can be used at test time to detect out-of-knowledge queries. Note that with synthetic queries this test no longer has a bounded type I error rate and the actual performance will depend on the divergence between $\hat{Q}_I$ and $Q_I$.

In addition to the above, the test may be extended against multiple samples from an unknown distribution within the corpus. Specifically, given a set of in-knowledge queries QI and a set of queries QP from unknown distribution P, we employ the non-parametric two-sample Kolmogorov-Smirnov (KS) test that calculates the largest difference of the eCDFs as the test statistic.

Thus, one or more embodiments establish a statistical framework for quantifying the relevance of query-knowledge relevance through goodness-of-fit hypothesis testing. Multiple testing procedures are presented, each with different goals of identifying low-relevance query samples and detecting query distribution shifts. The testing procedures may be used to determine a similarity score at step 204.

Step 206 includes determining whether the similarity score satisfies a threshold value. To satisfy the threshold value, the similarity score may meet or exceed the threshold value, for example, the threshold value may represent a minimal similarity score. Alternatively, the similarity score may satisfy the threshold value by being below the threshold value, for example, the threshold value may represent a maximum allowed distance, in the vector space, between the user query and the knowledge base corpus.

The threshold value may be determined by a number of methods. The threshold value may be pre-determined. The threshold value may be selected for a particular type of information within a corpus (e.g., a medical information corpus may be assigned a higher threshold value than a game corpus).

If the similarity score satisfies the threshold value (a "yes" result), Step 208 includes applying a language model to the user query and to the knowledge base corpus to output an answer to the user query. The language model may be applied to the query because the query has been determined to be an in-distribution query, relative to the knowledge base corpus. Thus, the similarity score satisfying the threshold score is an indication that the user query is an in-distribution query.

The language model generates natural language text from the user query and the knowledge base corpus. The natural language text represents an answer to the user query based on the information from the knowledge base corpus. The language model is applied to one or more documents in the knowledge base corpus. Thus, the information retrieved is taken from the knowledge base corpus.

Step 210 includes returning the answer to the user device. The answer may include the natural language text as well as data from the knowledge base corpus and/or documents stored in the knowledge base corpus.

If the similarity score does not satisfy the threshold value (a "no" result), Step 212 includes rejecting the user query by transmitting an electronic reject message to the user device. The electronic reject message may be a default message and/or may include an explanation for the rejection, for example, indicating the knowledge base corpus is not relevant to the user query.

While the various steps in this flowchart are presented and described sequentially, at least some of the steps may be executed in different orders, may be combined or omitted, and at least some of the steps may be executed in parallel. Furthermore, the steps may be performed actively or passively.

When responding to queries, knowledge bases can handle queries that are within the scope of their knowledge corpus. Language models (LMs) are known to suffer from hallucinations and misinformation when attempting to answer queries outside the knowledge corpus. Retrieval augmented generation (RAG), processes that improve the output of LMs, can retrieve relevant information from a knowledge corpus to complement parametric knowledge in LMs.

Figure 3:
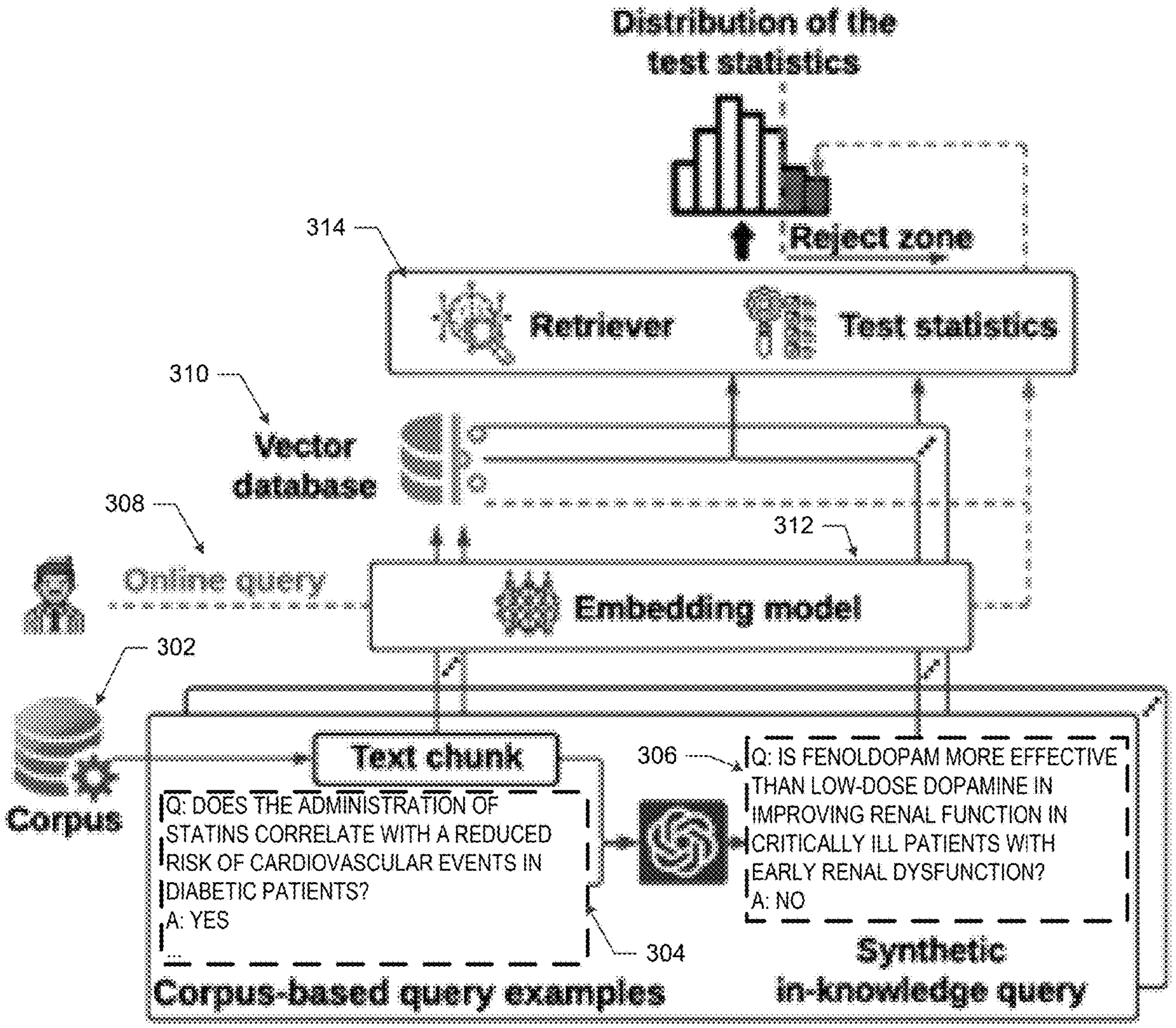
FIG. 3, FIG. 4, and FIG. 5 show an example of out-of-distribution query detection in accordance with one or more embodiments.

As described in FIG. 3, a server can assess a query, can be reliably answered by a knowledge base and, improve the knowledge base responses. Goodness-of-fit (GoF) tests may be used to inspect the relevance of each user query to detect out-of-knowledge queries that have low knowledge relevance.

FIG. 3 shows an example of out-of-distribution query detection in accordance to an embodiment. The detection in FIG. 3 provides a testing procedure that identifies out-of-knowledge queries. The procedure may be performed online as the response is received. If the response is deemed to be out-of-knowledge, the response can be rejected before using further computer resources to respond.

As shown, the system includes a corpus (302). The corpus (302) is a database of documents, such as articles, which cover a knowledge field. The field is defined by the documents and may change as documents are added, removed, or updated.

When the in-knowledge query distribution is unknown or has been recently updated, the system can generate a vector database (310) based on document chunks from the corpus (302). The synthetic vectors serve as a proxy to the true in-knowledge query distribution.

To generate the synthetic vectors, text chunks may be extracted from the documents in the corpus (302). The chunk may be selected from document directly, such as where the document includes questions with answers, to generate corpus-based query examples (304), or the document may be processed by a LM to generate a synthetic in-knowledge query (306) with an answer. The corpus-based query examples (304) and/or synthetic in-knowledge query examples (306) are processed by an embedding model (312), such as embedding model (138) of FIG. 1A, to generate the synthetic vectors. The synthetic vectors serve as a basis for establishing the scope of the corpus (302).

When an online query (308) is received, the online query (308) is also processed by an embedding model (312) to generate a query vector. The query vector is compared against the vectors in the vector database (310) by a processor (314) applying a retriever, and calculates test statistics to determine whether the query vector is within an acceptable distribution of the vectors in the vector database (310), for example, sufficiently semantically similar as described in FIG. 2.

Determining whether the query vector is within an acceptable distribution of the vectors in the vector database may be based on a similarity score between the query vector and the most relevant vector in the vector database as measured in the embedding space. The similarity score may also be based on a k-th nearest neighbor to the query vector as measured in the embedding space. Alternatively, the similarity score may be an average of similarity scores between the query vector and a limited number of nearest neighbors to the query vector as measured in the embedding space.

The query vector may be evaluated to determine if the query vector is within an acceptable distribution of the vectors in the vector database using other techniques. The system may determine entropy of the probability distribution to capture uncertainty, where a higher value indicates potential out-of-knowledge queries. The system may also use a free energy function of a softmax-based neural classifier to compute an energy score of the query with respect to the k nearest neighbors in the embedding space.

The vector database (310) may develop during operation. As new documents are added to the corpus (302), additional vectors may be generated based on text chunks from the new documents and added to the vector database (310). Likewise, if documents are updated (or removed), associated vectors in the vector database (310) may also be updated (or removed).

In an embodiment, the knowledge base corpus may be updated to remove out-of-distribution documents. For example, if a document in the knowledge base corpus is determined to be irrelevant to a query, or irrelevant to more than a predetermined number of received queries, then the document may be removed from the knowledge base corpus (and possibly moved to another knowledge base corpus). In another embodiment, if the query is out-of-distribution relative to the documents in the knowledge base corpus, then relevant documents may be found and added to the knowledge base corpus. In this case, the query may be run upon the revised corpus. Stated differently, the language model and the new query may be applied to the updated knowledge base corpus to generate an answer to the new query.

In still another embodiment, the if the query is determined to be an out-of-distribution query, then the query may be revised. The revised query is then checked by the above procedure. If the revised query is in-distribution relative to the knowledge base corpus, then the revised query may be executed by the language model on the knowledge base corpus.

Additionally, testing can examine a collection of queries to detect significant shifts in the query distribution. If present, the shifts may indicate the knowledge corpus is no longer sufficiently capable of supporting the interests of the users. Inaccurate responses may be generated when the query is outside of the scope of knowledge represented in the knowledge corpus or if the information in the corpus is out-of-date.

While periodic updates to the knowledge corpus can keep the corpus current, the updates may be performed too often and waste computing resources. The updates may also shift the knowledge base scope in ways that are undesirable. Thus, detection of shifts in the query distribution can improve the operation of the knowledge base by avoiding unnecessary updates and by targeting the updates to fields of knowledge that are of interest to the users.

Figure 4:
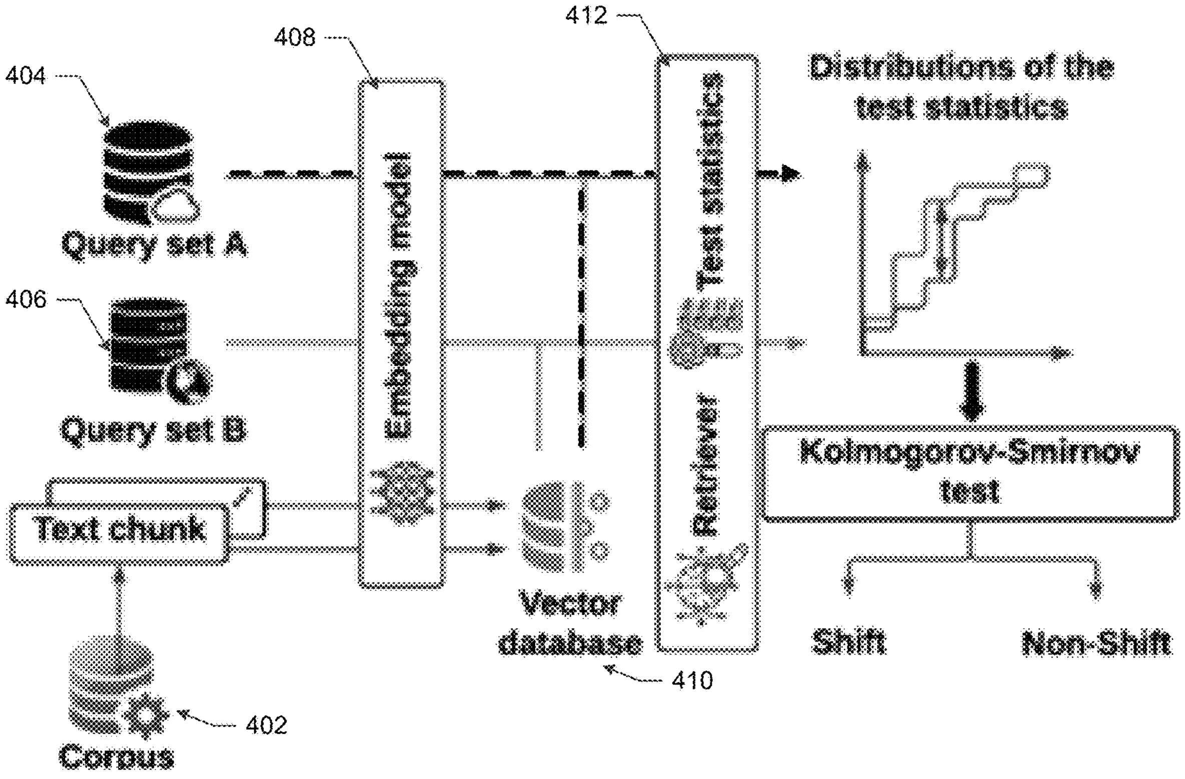

FIG. 4 shows an example of query shift detection in accordance to an embodiment. The detection in FIG. 4 is a procedure that identifies when queries have shifted in the embedding space. The procedure may be performed periodically, such as during routine maintenance, or as a response to certain query events. The query events that may trigger a check of the query distribution may include when a threshold number (or percentage) of queries are rejected, or after receiving a threshold number of queries.

Queries may be separated into two groups, those with a known in-knowledge distribution of request (query set A (404)), and those with an unknown distribution of requests, either in-knowledge or out-of-knowledge, (query set B (406)), such as queries received online. The system may also generate synthetic queries from the corpus (402) as an approximation to the in-knowledge distribution (query set A (404)) with similar empirical performance for detecting out-of-knowledge queries.

The vector representations of the queries are generated as discussed with relation to FIG. 3. Queries from the query set A (404), query set B (406) are processed by the embedding model (408) to create vectors. Documents from the corpus (402) may be used to create text chunks which are processed by the embedding model (408) to create synthetic vectors which may be used as query set A (404) or added to query set A (404). The resulting vectors may then be stored in the vector database (410).

When the query shift detection is performed, a processor (412) applies a retriever to gather the vectors from the vector database (410). The processor (412) determines test statistics to assign similarity scores for the vectors. The distribution of the similarity scores for the two is compiled, such as shown in a graph.

The distribution of the similarity scores from the query set A (404) and distribution of the similarity scores from the query set B (406) are compared to determine whether the distributions are sufficiently dissimilar to indicate a shift in the distributions. A similarity score may be assigned which indicates the degree to which the query set A (404) deviates from query set B (406).

The similarity score may be generated by the system using various techniques. In one example, a two-sample GoF test may be used to determine whether query set B (406) matches the empirical distribution of query set A (404). As another example, a processor may apply a non-parametric, two-sample Kolmogorov-Smirnov (KS) test to calculate the largest difference of the empirical cumulative distribution function (eCDFs) of each set as the test statistic.

When the distribution of query set A (404) and the distribution of query set B (406) are deemed to be sufficiently dissimilar, such as by exceeding a threshold limitation of similarity or exceeding a threshold difference of eCDFs, a significant shift may be determined. Significant shifts in query distribution can be indicative of a potential misalignment between the knowledge corpus and user interests and can suggest an outdated knowledge database. In response, the corpus (402) may be updated.

Figure 5:
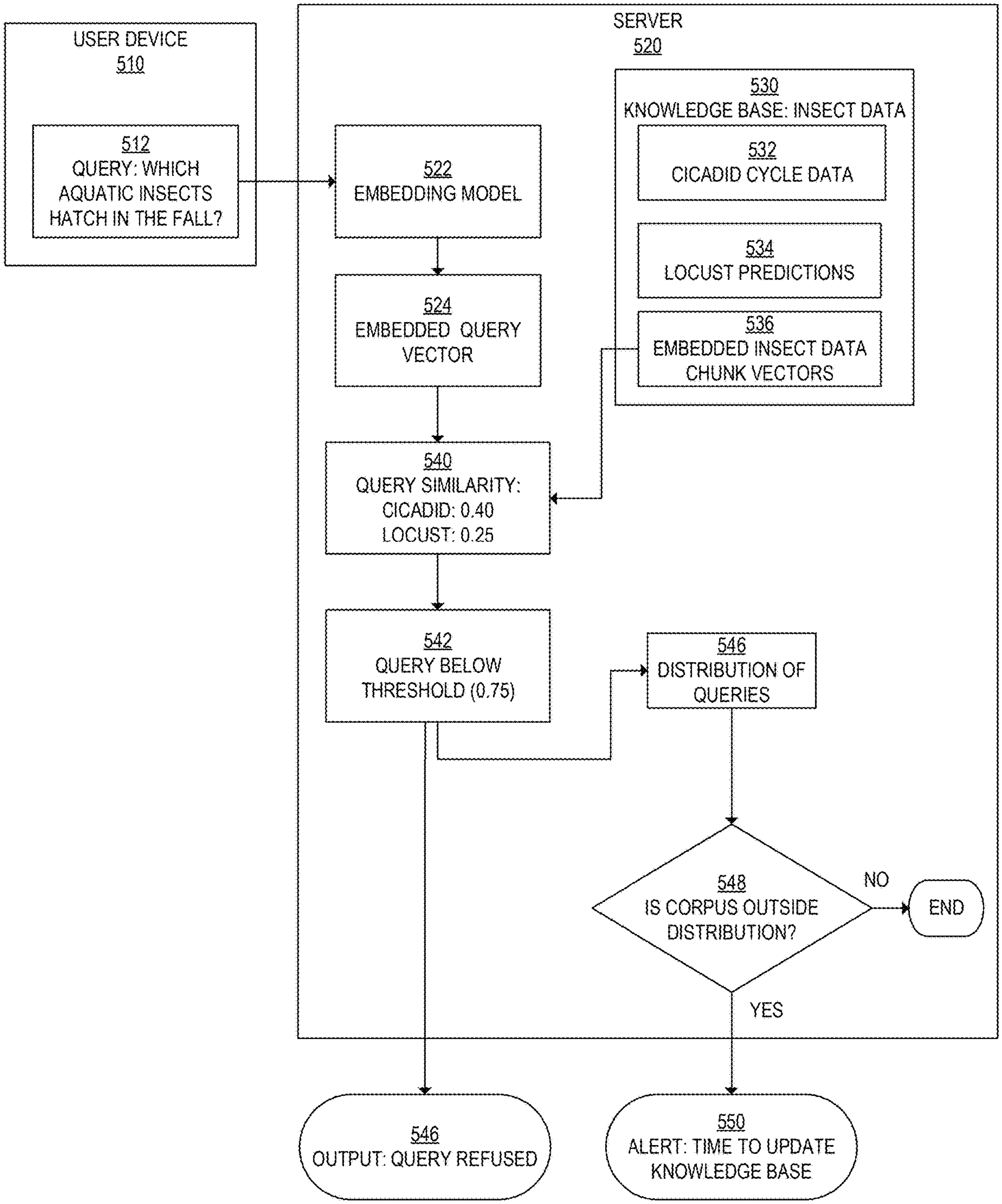

FIG. 5 demonstrates an example of an out-of-distribution query detection, in accordance with an embodiment. User device (510) sends a query (512) to server (520). The query (512) asks "Which aquatic insects hatch in the fall?"

The server (520) received the query (512) and applies an embedding model (522) to the query (512) to generate an embedded query vector (524). The embedded query vector (524) is a vector representation of the query (512) in an embedding space.

The server (520) stores a knowledge base (530) about insect data. The knowledge base (530) includes cicadid cycle data (532) and locust predictions (534). The server also stores embedded insect data chunk vectors (536), generated by applying the embedding model (522) on the cicadid cycle data (532) and locust predictions (534).

The server (520) compares the embedded query vector (524) and the embedded insect data chunk vectors (536) to assign query similarity scores (540) for the embedded query vector (524). The query similarity scores (540) indicate how semantically similar the embedded query vector (524) is to the embedded insect data chunk vectors (536). As shown, the query is assigned a similarity score of 0.40 to the cicadid cycle data (532) and a similarity score of 0.25 to the locust predictions (534).

The server determines whether the query is below the threshold of 0.75 (542). The server may take an average of the scores (here, 0.325) and compares the value to the threshold. As the average is below the threshold, the query is deemed to be an out-of-knowledge query and the server provides an output (545) indicating the query is rejected.

Additionally, the query is added to a distribution of queries (546), which may occur regardless of whether it was rejected or not. The distribution of queries is evaluated to determine if there is a query shift, such as described in relation to FIG. 4. If no shift is detected, the server ends the check. Otherwise, a shift has been detected and the server may send an alert (550) indicating the knowledge base is to be updated. The alert (550) may begin an automatic update procedure.

In an alternative, if a revised query instead was "what is the lifecycle of the cicada," then the similarity score of the query, when compared to the knowledge base of the cicadid cycle data (532) may be 0.95. The value of 0.95 exceeds the pre-determined threshold of 0.75, mentioned above. Thus, the language model may execute the revised query on the knowledge base: insect data (530). The generated answer is then returned to the user device (510).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
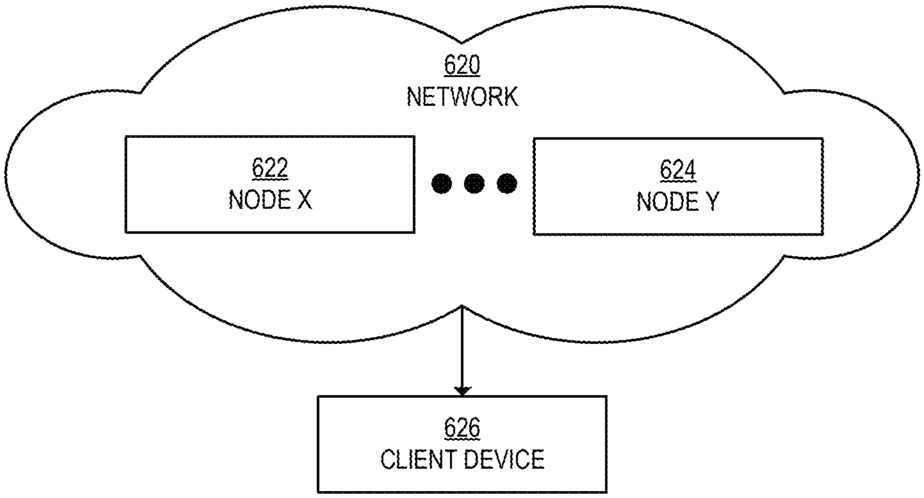

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving, at an embedding model executed by a processor, a user query from a user device;

applying the embedding model to the user query to generate a query vector data structure;

applying a vector comparator to the query vector data structure and a set of embedded document chunk vector data structures to output a similarity score, wherein:

the similarity score is a measure of a semantic similarity between the query vector data structure and the set of embedded document chunk vector data structures, the set of embedded document chunk vector data structures are generated by the embedding model applied to a knowledge base corpus comprising a plurality of documents, and each of the set of embedded document chunk vector data structures corresponds to an associated document of the plurality of documents;

determining that the similarity score fails to satisfy a threshold value;

identifying, responsive to the similarity score failing to satisfy the threshold value, the user query as being an out-of-distribution query;

transmitting an electronic reject message to the user device;

adding the user query to a query distribution data structure, the query distribution data structure representing a historic distribution of queries;

determining that a number of queries in the historic distribution of queries are outside a query threshold of the knowledge base corpus; and updating, responsive to the number of queries being outside the query threshold, the knowledge base corpus by updating the plurality of documents in the knowledge base corpus.

2. The method of claim 1, wherein the similarity score comprises a goodness-of-fit (GoF) test result between the query vector data structure and at least one embedded document chunk vector data structure.

3. The method of claim 1, wherein the similarity score is the measure of the semantic similarity between the query vector data structure and an embedded document chunk vector data structure from the set of embedded document chunk vector data structures that is nearest in embedded vector space to the query vector data structure.

4. The method of claim 1, wherein the similarity score is an average of measurements of the semantic similarity between the query vector data structure and a subset of embedded document chunk vector data structures from the set of embedded document chunk vector data structures.

5. The method of claim 1, wherein applying the vector comparator to the query vector data structure and the set of embedded document chunk vector data structures comprises computing an energy score of the user query with respect to a subset of embedded document chunk vector data structures from the set of embedded document chunk vector data structures.

6. The method of claim 1, further comprising adding an added document to the plurality of documents, wherein the added document is relevant to the user query.

7. The method of claim 1, further comprising transmitting an alert to the user device, responsive to the query threshold being outside the knowledge base corpus, that a shift in query distribution has occurred.

8. The method of claim 1, further comprising:

applying a language model to the plurality of documents to generate synthetic in-knowledge queries; and adding the synthetic in-knowledge queries to the query distribution data structure.

9. A system comprising:

a server comprising a processor;

a data repository in communication with the processor, and storing:

a user query, a query vector data structure, wherein the query vector data structure represents the user query in a vector space, a knowledge base corpus, the knowledge base corpus comprising a plurality of documents, a set of embedded document chunk vector data structures, wherein each of the set of embedded document chunk vector data structures represents an associated document of the plurality of documents, a threshold value, a query threshold value, a query distribution data structure representing a historic distribution of queries, an electronic reject message, and an embedded model, wherein the processor is programmed to apply the embedded model to a document to output a vector data structure;

a vector comparator, wherein the processor is programmed to apply the vector comparator to a plurality of vectors to output a similarity score, the similarity score is a measure of a semantic similarity between the plurality of vectors;

a language model, wherein the processor is programmed to apply the language model to the vector data structure to output a natural language text string; and a server controller executable by the processor to perform a computer-implemented method comprising:

receiving the user query from a user device;

applying the embedding model to the user query to generate the query vector data structure;

applying the vector comparator to the query vector data structure and the set of embedded document chunk vector data structures to output the similarity score;

determining that the similarity score fails to satisfy the threshold value;

identifying, responsive to the similarity score failing to satisfy the threshold value, the user query as being an out-of-distribution query;

transmitting an electronic reject message to the user device;

adding the user query to the query distribution data structure;

determining that a number of queries in the historic distribution of queries are outside a query threshold of the knowledge base corpus; and updating, responsive to the number of queries being outside the query threshold, the knowledge base corpus by updating the plurality of documents in the knowledge base corpus.

10. The system of claim 9, wherein the similarity score is the measure of the semantic similarity between the query vector data structure and an embedded document chunk vector data structure from the set of embedded document chunk vector data structures that is nearest in embedded vector space to the query vector data structure.

11. The system of claim 9, wherein applying the vector comparator to the query vector data structure and the set of embedded document chunk vector data structures comprises computing an energy score of the user query with respect to a subset of embedded document chunk vector data structures from the set of embedded document chunk vector data structures.

12. The system of claim 9, wherein the computer-implemented method further comprises:

adding an added document to the plurality of documents, wherein the added document is relevant to the user query, based on the similarity score.

13. The system of claim 12, wherein the computer-implemented method further comprises:

transmitting an alert to the user device, responsive to the query threshold being outside the knowledge base corpus, that a shift in query distribution has occurred.

14. The system of claim 9, further comprising:

applying the language model to the plurality of documents to generate synthetic in-knowledge queries; and adding the synthetic in-knowledge queries to the query distribution data structure.

* * * * *